May 9, 1939.                    C. F. BAISCH                    2,157,091
                              BRAKE MECHANISM
                    Filed April 20, 1936          5 Sheets-Sheet 1
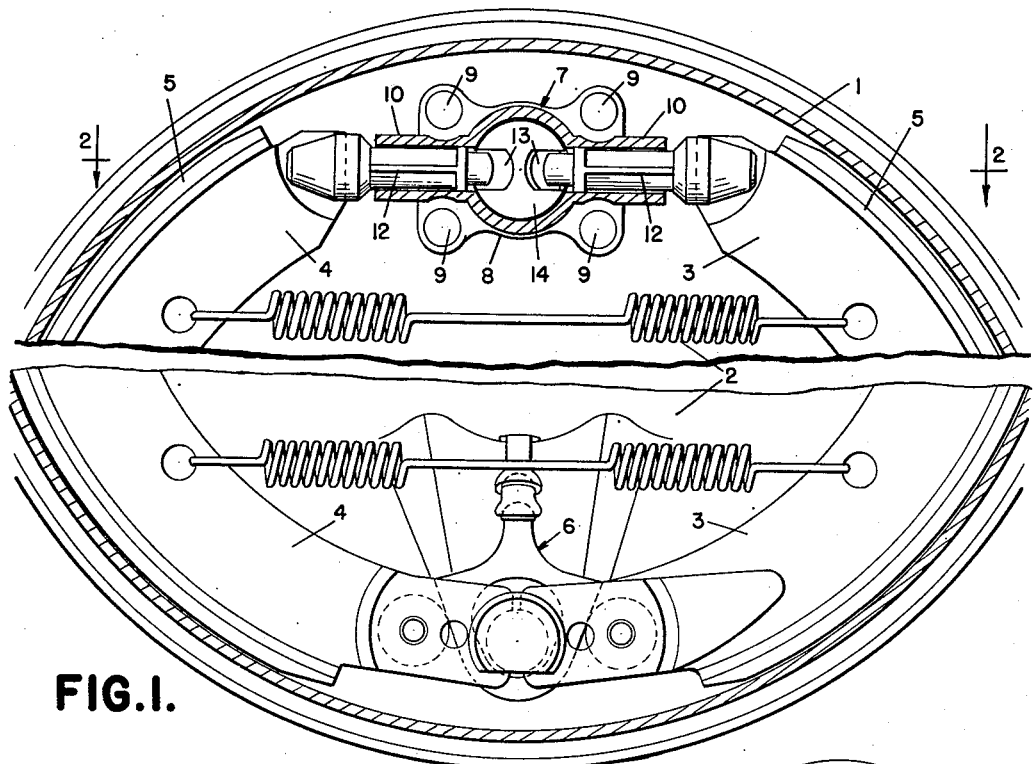
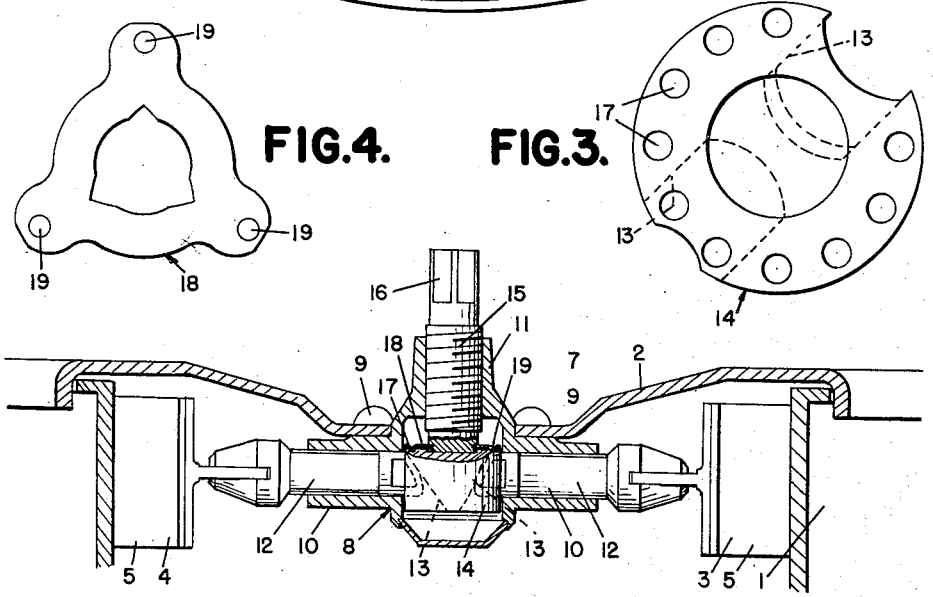
INVENTOR
CARL F. BAISCH
BY *Whittemore Hulbert Whittemore Belknap,*
ATTORNEYS May 9, 1939.  C. F. BAISCH  2,157,091
BRAKE MECHANISM
Filed April 20, 1936   5 Sheets-Sheet 2
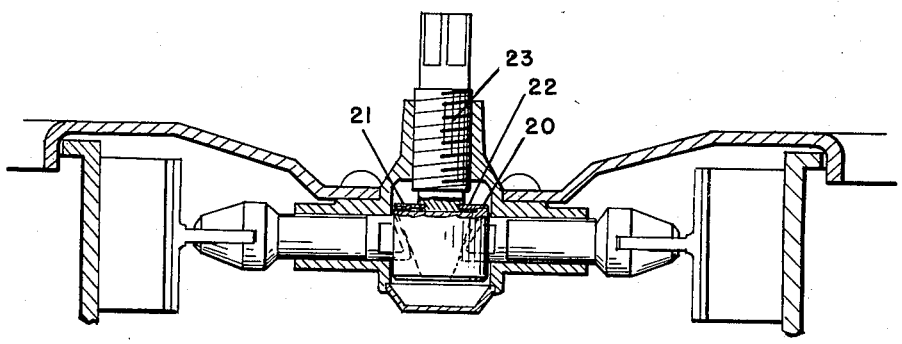
FIG.5.
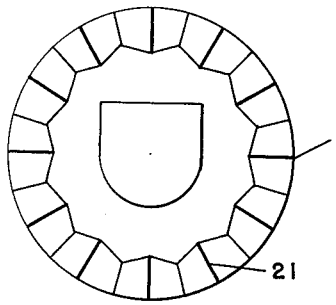
FIG.7.
FIG.8.
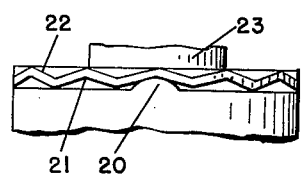
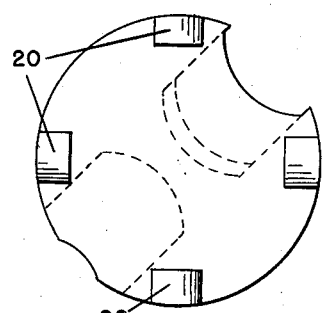
FIG.6
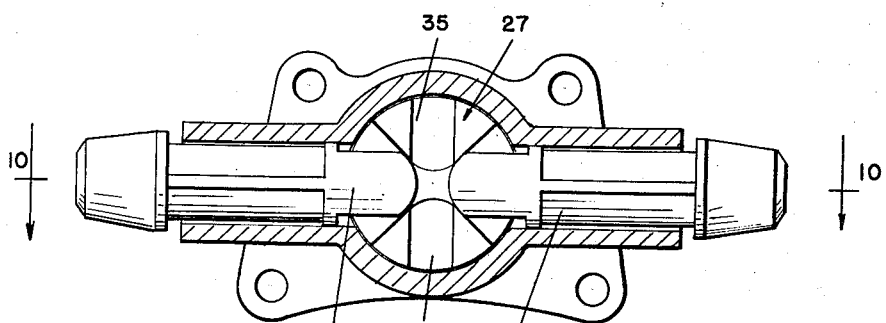
FIG.9.
INVENTOR
CARL F. BAISCH
BY *Whittemore Hulbert Whittemore Belknap*
ATTORNEYS

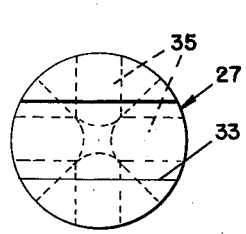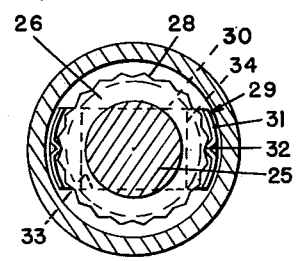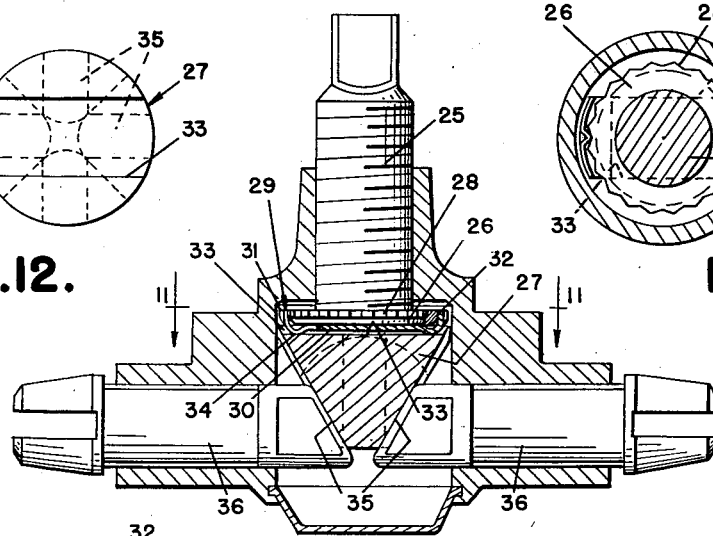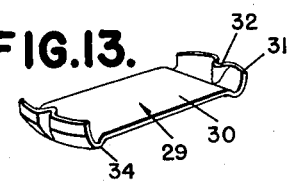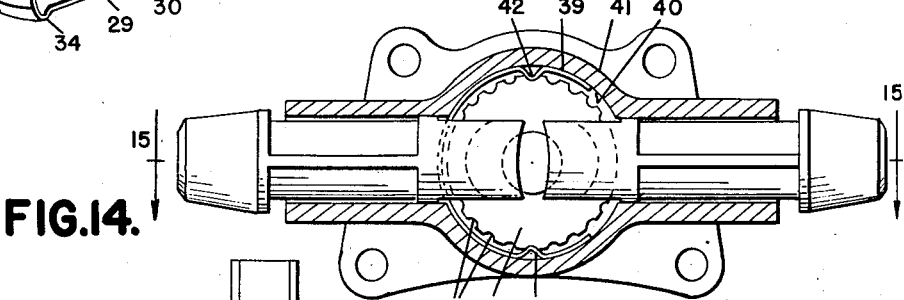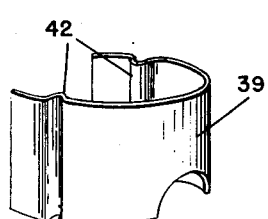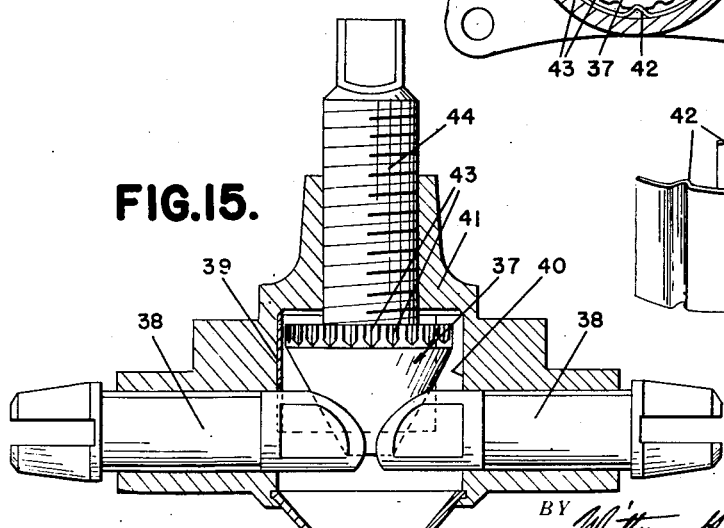

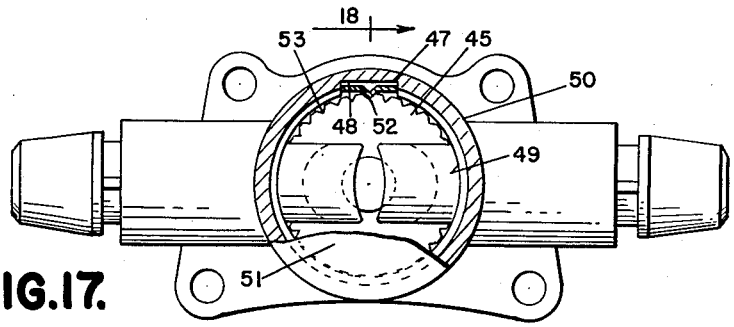
FIG.17.
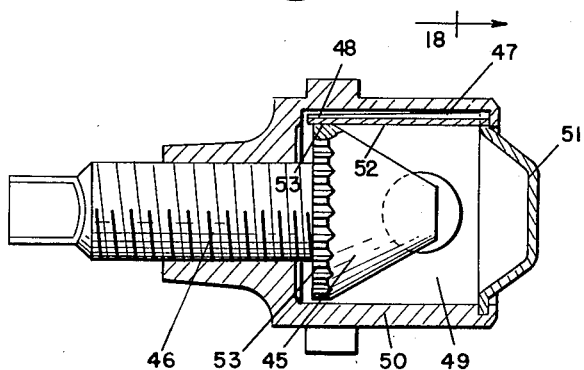
FIG.18.
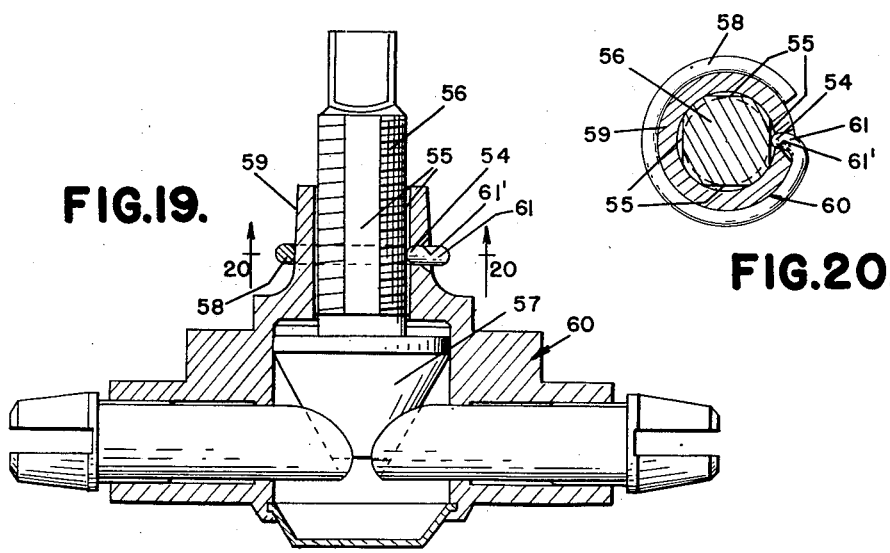
FIG.19.
FIG.20.
*INVENTOR*
CARL F. BAISCH
BY
*ATTORNEYS*

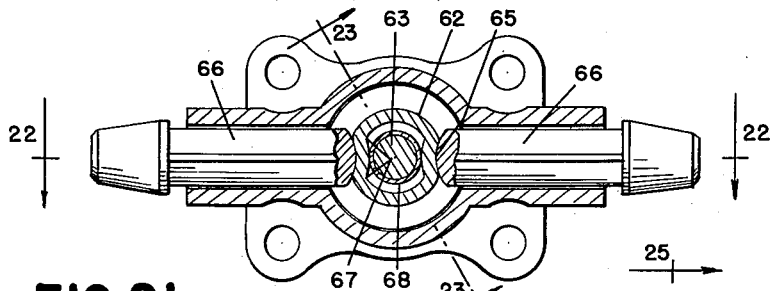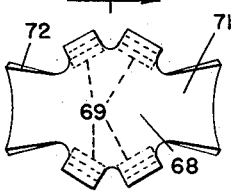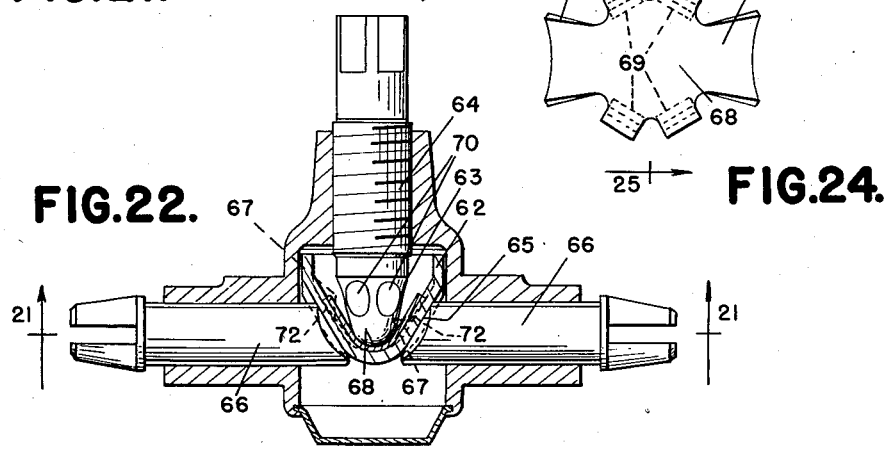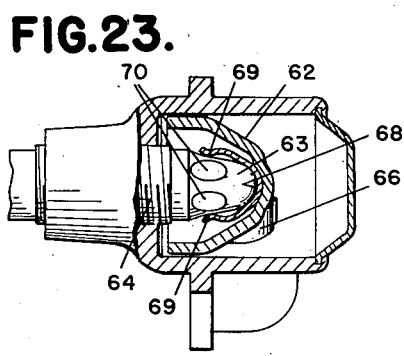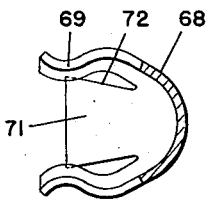

Patented May 9, 1939

2,157,091

UNITED STATES PATENT OFFICE 2,157,091

BRAKE MECHANISM

Carl F. Baisch, Detroit, Mich., assignor to Kelsey-Hayes Wheel Company, Detroit, Mich., a corporation of Delaware Application April 20, 1936, Serial No. 75,458

15 Claims. (Cl. 188—79.5)

The invention relates to brake mechanisms and refers more particularly to adjustment anchor devices for brake friction means.

The invention has for one of its objects to provide an improved adjustment anchor device comprising a member for adjusting the brake friction means and a second member for directly adjusting the first mentioned member. The invention has for another object to provide an adjustment anchor device in which there is no lost motion between the adjustable members during adjustment. The invention has for a further object to provide improved means for locking one of the members in adjusted position and for indicating predetermined increments of adjustment.

These and other objects of the invention will become apparent from the following description, taken in connection with the accompanying drawings, in which Figure 1 is an elevation, partly in section, of a brake mechanism showing an embodiment of my invention;

Figure 2 is a cross section on the line 2—2 of Figure 1;

Figures 3 and 4 are plan views of cooperating parts of the adjustment anchor device;

Figure 5 is a view similar to Figure 2 showing another embodiment of my invention;

Figures 6 and 7 are plan views of cooperating parts of the adjustment anchor device;

Figure 8 is an edge elevation of these parts in engagement;

Figure 9 is a fragmentary side elevational view showing another modified form of adjustment anchor device;

Figure 10 is a sectional view taken substantially on the plane indicated by the line 10—10 of Figure 9;

Figure 11 is a cross sectional view taken substantially on the plane indicated by the line 11—11 of Figure 10;

Figure 12 is an end elevational view of the adjusting wedge featured in Figure 10;

Figure 13 is a detail perspective view of the flexible latch member employed in Figure 10;

Figure 14 is an elevational view, partly in section, of a further embodiment of this invention;

Figure 15 is a sectional view taken substantially on the plane indicated by the line 15—15 of Figure 14;

Figure 16 is a detail perspective view of the spring latch featured in Figure 15;

Figure 17 is a side elevational view, partly in section, of another modified form of adjustment anchor device having certain parts broken away for the sake of clearness;

Figure 18 is a sectional view taken substantially on the plane indicated by the line 18—18 of Figure 17;

Figure 19 is a longitudinal sectional view through a further embodiment of this invention;

Figure 20 is a cross sectional view taken substantially on the plane indicated by the line 20—20 of Figure 19;

Figure 21 is a side elevational view, partly in section, of a further modified form of adjustment anchor device;

Figure 22 is a sectional view taken substantially on the plane indicated by the line 22—22 of Figure 21;

Figure 23 is a sectional view taken substantially on the plane indicated by the line 23—23 of Figure 21;

Figure 24 is a plan view of the spring latch member employed in the construction shown in Figure 22; and Figure 25 is a cross sectional view taken substantially on the plane indicated by the line 25—25 of Figure 24.

The brake mechanism, as illustrated in Figures 1 to 4 inclusive, comprises the brake drum 1, the backing plate 2 and brake friction means within the brake drum in the nature of brake shoes 3 and 4 having the friction linings 5 engageable with the brake flange. The upper ends of these brake shoes are spaced and adapted to be anchored upon the backing plate 2 and their lower ends are spaced and engageable with a suitable actuator 6 for spreading the shoes apart and forcing their friction linings into engagement with the brake flange. Suitable springs between the upper ends and the lower ends of the brake shoes retract and resiliently hold the brake shoes in their normal or inoperative positions.

For anchoring the brake shoes upon the backing plate 2, there is the adjustment anchor device 7 located between the anchored ends of the shoes. This device comprises the bracket 8 secured by suitable means, such as the rivets 9, to the backing plate, the bracket having the tubular portions 10 within the brake drum and the internally threaded transverse portion 11 which extends through the backing plate. 12 are adjustment links having bifurcated heads at their outer ends receiving the adjacent ends of the brake shoes and having stems extending through the tubular portions and also having flattened inner end portions which are engageable in the grooves 13 formed in diametrically opposite sides of the wedge 14. The wedge is movable longitudinally or axially in a direction radially of the brake drum and transversely of the brake shoes. The bottoms of these grooves are inclined relative to the axis of the wedge and converge inwardly so that longitudinal or axial adjustment of the wedge in an inward direction compels adjustment of the links and brake shoes.

For longitudinally or axially adjusting the wedge inwardly, I have provided the screw 15 threaded in the internally threaded portion 11 of the bracket and having the outer polygonally shaped end 16 for engagement with a suitable tool, such as a wrench, outside the brake drum and backing plate. The inner end of this screw directly abuts the central portion of the outer end of the wedge so that the screw is adapted to directly adjust the wedge without lost motion therebetween.

For the purpose of locking the wedge in various positions of adjustment, the outer end of the wedge is formed with the annular series of rounded recesses or depressions 17, as shown particularly in Figure 3, and the screw has fixedly secured thereto the flexible detent member 18 provided with the rounded projections 19 for engaging the recesses or depressions 17. This detent is preferably formed of spring steel and is of general triangular shape in plan and the projections are formed in the outer ends of the apices or arms. It will be seen that with this construction predetermined increments of adjustment are also indicated by reason of the projections successively engaging the recesses or depressions.

The modification illustrated in Figures 5, 6, 7 and 8 is substantially the same as that illustrated in Figures 1 to 4 inclusive, with the exception of the means for locking the wedge in various positions of adjustment or indicating predetermined increments of adjustment, or both. This means comprises the angularly spaced projections 20 upon the outer end of the wedge near its periphery and the corrugated portion 21 at the periphery of the flexible member 22 which latter is fixedly secured to the inner end of the adjustment screw 23. The projections 20 extend radially and are transversely rounded and the corrugated portion 21 forms an annular series of V-shaped radially extending grooves engageable with the projections. The flexible member 22 is preferably formed of spring steel.

The embodiment of the invention disclosed in Figures 9 to 13 inclusive differs from the foregoing in the particular means employed for locking the wedge in various positions of adjustment and for indicating the predetermined increments of adjustment. In detail, the adjusting screw 25 is provided with an enlarged substantially flat head portion 26 at the inner end thereof for engaging the outer surface of the axially movable wedge 27. Upon reference to Figure 11, it will be noted that the periphery of the head 26 on the screw 25 is formed with a predetermined number of notches 28 engageable with a spring latch member 29. The latch member 29 is shown in detail in Figure 13 and comprises a body portion 30 disposed between the head 26 on the screw 25 and the outer surface of the wedge 27. In addition, the member 29 is provided with diametrically opposed outwardly extending flanges 31 adapted to assume positions at opposite sides of the head 26 and having V-shaped projections 32 engageable in the notches 28.

As shown in Figure 10, the body portion 30 of the member 29 is disposed in a recess 33 formed in the outer surface of the wedge 27 transversely of the axis of the latter. In the present instance, the body portion 30 of the spring member 29 is held in spaced relation to the outer surface of the wedge 27 by means of arcuate beads 34 connecting the ends of the body portion with the flanges 31. The arcuate beads 34 serve to tension the spring member 29 upon feeding the screw 25 axially inwardly or, in other words, serve to yieldably urge the projections 32 into more intimate contact with the notches 28 in the head 26 of the screw. The number of notches 28 are predetermined in dependence upon the threads on the screw 25 so as to provide for accurately indicating the increments of adjustment of the wedge 27 and consequently of the shoes operatively connected to this wedge. It may be pointed out in connection with this embodiment of the invention that the inclined surface of the wedge is provided with four grooves 35 arranged at right angles to each other and fashioned to receive the inner ends of the adjusting links 36 for the shoes. This construction materially facilitates assembly in that it permits the wedge to be inserted in the anchor bracket in positions at right angles to each other.

The modified form of construction shown in Figures 14 to 16 inclusive also features a construction of adjustment anchor device having no lost motion and embodying means for not only locking the wedge in various positions of adjustment, but for also indicating predetermined increments of adjustment. In this embodiment the wedge 37 is frusto-conical in shape and is formed with a plane surface or, in other words, is devoid of grooves in the sides thereof for receiving the inner ends of the adjustment links 38.

The form of spring latch member employed in connection with the present modification is shown in Figure 16 by the reference character 39. The member 39 forms a section of a cylinder and is adapted to be assembled in the bore 40 of the anchor bracket 41 in the manner clearly shown in Figure 15. As will be observed from this figure, the member 39 partially surrounds the wedge 37 and is formed adjacent the outer edge with diametrically opposed projections 42 adapted to successively engage notches 43 formed on the sides of the wedge 37 adjacent the outer end of the latter. It may be pointed out in this connection that the portion of the wedge 37 having the notches 43 formed therein is cylindrical and also that this wedge forms an integral part of the adjusting screw 44. Notwithstanding the fact that the wedge 37 is an integral part of the screw 44, the principle of operation of the member 37 to lock the wedge in its various positions of adjustment and to indicate predetermined increments of adjustment is the same as hereinbefore set forth in connection with the above described form of this invention.

In the modification of the invention shown in Figures 17 and 18, the wedge 45 and associated adjusting screw 46 are the same in construction as the wedge defined in connection with the embodiment of the invention shown in Figures 14 to 16 inclusive. The latch for locking the wedge in its various positions of adjustment and for indicating predetermined increments of adjustment differs from the above constructions in that it comprises a spring strip 47 extending axially of the screw 46 and housed within a recess 48 formed in one side wall of the bore 49 in the anchor bracket 50. Upon reference to Figure 18, it will be noted that the inner end of the spring member 47 is secured in the recess 48 by means of the plug 51 closing the inner end of the bore 49. The full length of the member 47 is free except as noted above and is V-shaped in cross section so that the apex of the V 52 is adapted to successively engage in the notches 53 formed on the wedge 45 as the wedge advances in the bore to not only lock the wedge in its various positions of adjustment, but to also indicate predetermined increments of adjustment.

In the embodiment of the invention shown in Figures 19 and 20, the wedge is locked in its various positions of adjustment and predetermined increments of adjustment are indicated by the action of a spring detent 54 on flats 55 formed on the sides of the adjusting screw 56 for the wedge 57. In detail, the spring detent comprises a clip 58 of spring wire encircling the adjusting screw hub 59 on the anchor bracket 60 and having the end 61 bent inwardly to extend through an opening 61' in the side of the hub for successive engagement with the flats 55 on the screw 56.

In the modification featured in Figures 21 to 25 inclusive the wedge 62 is formed of a stamping and the inner end 63 of the adjusting screw 64 extends into the wedge for engagement therewith in the manner shown in Figure 22. It will also be observed from this latter figure that the wedge is provided with diametrically opposed depressions 65 for engagement with the inner ends of the shoe adjusting links 66 and these depressions form shoulders 67 on the wedge, the purpose of which will be more fully hereinafter set forth. Interposed between the inner end 63 of the screw 64 and the adjacent surface of the wedge 62 is the spring latch member 68 having the contour shown in Figure 25. In detail, the spring latch member 68 is provided with outwardly extending spring fingers 69 successively engageable with flats 70 on the sides of the inner end portions 63 of the screw 64 to not only lock the wedge in its various positions of adjustment, but to also indicate predetermined increments of adjustment. The spring member 68 is prevented from rotation or, in other words, is held in assembled relation with the wedge by virtue of the fact that the projections 71 on the spring member are transversely curved to conform to the interior surface of the depressions 65 in diametrically opposite sides of the wedge 62 and this provides for engaging the edges 72 of the projections 71 with the shoulders 67 to prevent rotation of the spring member 68 relative to the wedge.

While a number of different modifications have been selected for the purpose of illustrating this invention, nevertheless it will be noted that each of the modified constructions possess certain common features. For example, it will be seen that each of the constructions contemplates an adjustment anchor device which has no lost motion or lost clearance in advancing the adjustment and which at the same time provides a lock to prevent retraction of the adjustment under torque and vibration. In addition, each of the embodiments hereinbefore described render it possible to indicate predetermined increments of adjustment and this is desirable in that it provides for maintaining a minimum desired clearance between the shoes and the brake flange.

What I claim as my invention is:

1. In a brake mechanism, the combination with a brake drum and brake friction means engageable with said drum and having ends, of an adjustment anchor device for said friction means, said device comprising a bracket, links guided by said bracket and operatively connected to said ends, a longitudinally adjustable wedge for adjusting said links, said wedge being held from rotation, a rotatable member carried by said bracket for adjusting said wedge longitudinally, and cooperating means upon said wedge and member including a flexible member for indicating predetermined increments of adjustment.

2. In a brake mechanism, the combination with a brake drum and brake shoes engageable with said drum and having spaced ends, of an adjustment anchor device for said shoes located between said ends, said device comprising a bracket, links guided by said bracket and operatively connected to said ends, an axially adjustable wedge for adjusting said links, said wedge being held from rotation, a rotatable member carried by said bracket for adjusting said wedge axially, said wedge being provided with angularly spaced shoulders, and a flexible detent upon said rotatable member engageable with said shoulders and cooperating therewith to indicate predetermined increments of adjustment.

3. In a brake mechanism, the combination with a brake drum and brake friction means engageable with said drum and having ends, of an adjustment anchor device for said friction means, said device comprising a longitudinally adjustable wedge for adjusting said ends, a member for adjusting said wedge longitudinally, and cooperating means upon said wedge and member including a flexible member for indicating predetermined increments of adjustment.

4. In a brake mechanism, the combination with a brake drum and brake friction means engageable with said drum and having ends, of an adjustment anchor device for said friction means comprising an axially adjustable wedge for adjusting said ends, said wedge having angularly spaced shoulders, a rotatable axially adjustable member for adjusting said wedge axially, and a resilient detent upon said member engageable with said shoulders and adapted to cooperate therewith to indicate predetermined increments of adjustment.

5. In a brake mechanism, the combination with a brake drum and brake friction means engageable with said drum and having ends, of an adjustment anchor device for said friction means, said device comprising a longitudinally adjustable member, a rotatable member for adjusting said first mentioned member longitudinally, and means for indicating predetermined increments of adjustment, comprising a shoulder upon one of said members and a flexible detent upon the other of said members.

6. In a brake mechanism, the combination with a brake drum and brake friction means engageable with said drum, of a member adjustable transversely of said friction means, a second rotatable member for adjusting said first mentioned member, and means comprising a flexible member secured to the rotatable member and cooperating with means on the first member for locking one of said members in adjusted position.

7. In a brake mechanism, the combination with a brake drum and brake friction means engageable with said drum, of a member adjustable transversely of said friction means, a second member for directly adjusting said first mentioned member without lost motion, and means comprising a flexible member secured to one of said members and cooperating with means on the other member for indicating predetermined increments of adjustment.

8. In a brake mechanism, the combination with a brake drum and brake friction means engageable with said drum and having ends, of an adjustment anchor device for said friction means, said device comprising a longitudinally adjustable wedge of hollow construction, means for moving the wedge longitudinally including a member extending into the wedge, and a spring element housed within the wedge and having portions cooperating with flats on said member for indicating predetermined increments of adjustment.

9. In a brake mechanism, the combination with a brake drum and brake friction means engageable with said drum and having ends, of an adjustment anchor device for said friction means, said device comprising a longitudinally adjustable wedge of hollow construction, means for longitudinally moving the wedge including a member extending into the wedge, and a spring element housed within the wedge between the latter and member aforesaid provided with spring fingers engageable with flats on said member to indicate predetermined increments of adjustment.

10. In a brake mechanism, the combination with a brake drum and brake friction means engageable with said drum and having ends, of an adjustment anchor device for said friction means, said device comprising a rotatable longitudinally adjustable wedge having an uninterrupted exterior surface for adjusting said ends and having notches spaced circumferentially thereof, a member connected to the wedge for actuating the latter, and a spring member fixed against rotation with respect to the wedge and having portions engageable with the notches for indicating predetermined increments of adjustment.

11. In a brake mechanism, the combination with a brake drum and brake friction means engageable with said drum, of means for adjusting the friction means relative to the drum including a member movable transversely of the friction means, a second adjustable member for moving the first named member, and means comprising a flexible member secured to one of said members and cooperating with means on the other of the members for locking one of the members in adjusted position.

12. In a brake mechanism, the combination with a brake drum and brake friction means engageable with said drum and having ends, of means for adjusting the brake friction means relative to the drum including a wedge movable transversely of the friction means between said ends, a rotatable member connected to the wedge for actuating the latter, and a spring element fixed against rotation with respect to the wedge and cooperating with means on said wedge for indicating predetermined increments of adjustment.

13. In a brake mechanism, the combination with a brake drum and brake friction means engageable with said drum and having spaced ends, of means for adjusting the friction means relative to the drum including a member movable transversely of the friction means between said ends, a second revoluble member connected to the first named member for actuating the latter, one of the members having circumferentially spaced notches, and a spring element fixed against rotation with respect to the members and having a portion successively engageable with the notches for indicating predetermined increments of adjustment.

14. In brake mechanism, the combination with a brake drum and brake friction means engageable with said drum, of an adjustment anchor device for said friction means, said device comprising a longitudinally adjustable member, a separate rotatable member for directly adjusting said first mentioned member, and means comprising a flexible element secured to the rotatable member and engageable with means fixed against rotation with respect to the rotatable member for locking the latter member in adjusted position.

15. In brake mechanism, a brake drum, a backing plate for the drum, brake friction means supported on the backing plate within the drum for engagement with the latter, a bracket having a portion extending through the backing plate between the ends of the friction means and provided with a threaded bore, means for adjusting the friction means including a wedge member supported in the bracket for movement substantially parallel to the axis of the drum and a stem member threaded in said bore for moving the wedge, and a flexible element cooperating with one of the members to hold the wedge in any one of its several adjusted positions and to indicate predetermined increments of adjustment of the wedge.

CARL F. BAISCH.